United States Patent [19]
Nomura et al.

[11] Patent Number: 6,072,627
[45] Date of Patent: *Jun. 6, 2000

[54] STEREOSCOPIC IMAGE CAPTURE DEVICE

[75] Inventors: Toshio Nomura, Ichihara; Masayuki Katagiri, Ikoma; Keisuke Iwasaki, Ikoma-gun; Noritoshi Kako, Chiba, all of Japan

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/685,468

[22] Filed: Jul. 24, 1996

[30] Foreign Application Priority Data

Jul. 24, 1995 [JP] Japan .................................. 7-187580

[51] Int. Cl.$^7$ .......................... G02B 27/22; G02B 27/10; G02B 35/00; G02B 35/08
[52] U.S. Cl. .......................... 359/463; 359/462; 359/619; 359/621; 359/622; 359/623; 359/624; 352/57; 352/61
[58] Field of Search .......................... 348/49, 59; 352/61, 352/57, 60; 359/462, 463, 619, 620, 621, 622, 623, 624

[56] References Cited

U.S. PATENT DOCUMENTS 1,970,311  8/1934  Ives .......................................... 359/463
4,621,897  11/1986  Bonnet .................................... 359/462

FOREIGN PATENT DOCUMENTS 1-254092  10/1989  Japan .

OTHER PUBLICATIONS

J. Hamasaki, "Autostereoscopic 3D Display by Multi--Eyes", The Journal of the Institute of Television Engineers of Japan, vol. 43, No. 8, p. 772 (1989)—Partial Translation.

Primary Examiner—Audrey Chang
Attorney, Agent, or Firm—David G. Conlin; George W. Neuner; Dike, Bronstein, Roberts and Cushman LLP

[57] ABSTRACT

A stereoscopic image capture device of this invention includes: an image capturing face on which light from an object is incident; an optical element disposed on a side of the image capturing face on which the light is incident, the optical element converting an angle at which the light is incident thereon to a distance from an optical axis the optical element; and an afocal optical system including a plurality of lenses, wherein the afocal optical system forms, on the optical element, an image of the object formed on one of the plurality of lenses which is closest to the object.

9 Claims, 10 Drawing Sheets

STEREOSCOPIC IMAGE CAPTURE DEVICE

BACKGROUND OF THE INVENTION

1. Field of the Invention

The present invention relates to a stereoscopic image capture device for inputting a stereoscopic image to be displayed by a three-dimensional image display device.

2. Description of the Related Art

A three-dimensional image display device, which allows an observer to perceive the stereoscopic image by reproducing the intensity and direction of a light beam recorded by an image capture device, is conventionally known. Hereinafter, this reproduction method is referred to as a light reproduction method. The principle of recording and reproduction of the stereoscopic image by employing the light reproduction method will be briefly described below.

First, as shown in FIG. 10, an image of an object is recorded while a slit array 32 is placed in front of a recording face 31. As in a CCD, the recording face 31 is pixellated and each pixel of the recording face 31 records a respective section of the image of an object to be recorded. Although light beams are diffused in every direction from each of objects A and B, only the light beams passing through slits of the slit array 32 can reach the recording face 31. Therefore, the position of each slit corresponds to the position of a microcamera. If only the horizontal components of the light carrying the image are considered, only a light beam incident on the pixel of the recording face 31 at an angle determined by the positional relationship between the pixel and a corresponding slit is recorded in the pixel of the recording face 31. Regarding the vertical components, it is necessary to converge the vertical components of the light on the recording face 31 through a lens. However, the description thereof is herein omitted since it is not relevant to the principle of the present invention.

The thus recorded image is reproduced by a three-dimensional display device having such a configuration that a slit array 34 is disposed in front of a pixellated display face 33 as shown in FIG. 11. In order to prevent the fore part and the back part of the reproduced image from being inverted in a depth direction, the pixel order within each group of pixel is inverted (i.e., the image section recorded as the left-most pixel of a slit becomes as that slit's right-most pixel). The light beam going out from one pixel to pass through a slit travels only in the direction determined by the positional relationship between the pixel and the corresponding slit. Since a recording pixel and a corresponding display pixel are symmetrically positioned relative to the slit, the light beams passing through the slit array panel 34 travel in the same directions as those during recording. An observer can perceive the stereoscopic image by observing the thus travelling light beam. More specifically, the light beams actually travel in a forward direction (that is, in a direction toward an observer) from the display face 33. Since information of one object point travels from a plurality of pixels (for example, pixels a5, b3 and c2) via a plurality of corresponding slits (a, b and c) at different angles, the observer perceives as if the light beams travel from one object point located far behind the display face 33. Since such a phenomenon occurs for all display points, the observer can perceive a stereoscopic view.

Although the slit array is used in the above conventional three-dimensional display device, a cylindrical lens array (i.e., a lenticular lens) can be used instead in the light reproduction method since the cylindrical lens array has an equivalent function as that of the slit array.

FIG. 12 shows an example of an image capture device employing the light reproduction method. This image capture device includes: an image capturing face 101; a cylindrical lens array 102 disposed in front of the image capturing face 101; and a cylindrical lens 103 for converging vertical components, disposed in front of the cylindrical lens array 102. Since the cylindrical lens 103 has a curvature only in the vertical direction, it does not affect the horizontal components.

The image capturing face 101 is disposed on a focal plane of the cylindrical lens array 102. The horizontal components of light beams are recorded by the cylindrical lens array 102 at the positions on the image capturing face 101 determined by the incident angles of the light beams. Since each cylindrical lens of the cylindrical lens array 102 functions as a microcamera, it is considered that the image capture device shown in FIG. 12 includes a plurality of cameras, e.g., several tens to several hundreds of cameras arranged in a parallel manner. In the example shown in FIG. 12, the image capturing face 101 should have the same size as that of the display face of the three-dimensional display device. Moreover, a pixel pitch of the image capturing face 101 should be the same as that of the display panel serving as the display face of the three-dimensional display device.

Another example of an image capture device used in the light reproduction method is disclosed in Japanese Laid-Open Patent Publication No. 1-254092. FIG. 13A is a horizontal cross-sectional view showing an image capture device disclosed in the aforementioned Patent Publication, and FIG. 13B is a vertical cross-sectional view of a pinhole plate 106 shown in FIG. 13A. The image capture device includes: an image capturing face 104; a convex lens 105 disposed in front of the image capturing face 104; and the pinhole plate 106 disposed onto the front face of the convex lens 105. A distance between the image capturing face 104 and the convex lens 105 is set so as to be equal to a focal length f of the convex lens 105. An electric optical device such as a liquid crystal device is used as the pinhole plate 106. A pinhole 107 is movable on the pinhole plate 106. Japanese Laid-Open Patent Publication No. 1-254092 also shows a Fresnel lens as the convex lens 105. For better understanding of the present invention, however, FIGS. 13A and 13B show a conventional planoconvex lens having the same function.

In the image capture device having the configuration as shown in FIGS. 13A and 13B, the position of the movable pinhole 107 corresponds to the position of a general viewing point of a camera. Therefore, a plurality of images taken at a plurality of viewing points of the camera are imaged on the image capturing face 104 in a time divided manner. Thus, the position of the pinhole 107 corresponds to one cylindrical lens of the cylindrical lens array 102 shown in FIG. 12. Similar to the example shown in FIG. 12, the image capturing face 104 and the display face of the three-dimensional display device should also be equal to each other in size in this conventional example. However, by scanning in a time divided manner, one image corresponding to the image on the entire image capturing face 104 shown in FIG. 12 can be obtained. Therefore, the size of one image can be reduced, resulting in reduction in size of the image capturing face 104.

However, the aforementioned conventional techniques have the following problems.

In the image capture device shown in FIG. 12, the image capturing face 101 is required to be equal in size to the display face as described above. Moreover, the pixel pitch of the image capturing face is required to be equal to that of the display face. However, it is extremely difficult to constitute such an image capturing face by a photoelectric conversion device such as a CCD, that is, it is next to impossible to realize such an image capturing face.

On the other hand, in the image capturing device shown in FIGS. 13A and 13B, the position of the pinhole 107 is required to be moved at high speed, e.g., the pinhole is required to scan the image 60 times per second, in order to prevent the flicker of the image. However, a device suitable for constituting an optical shutter capable of responding at such a high speed does not exist at present. When it is assumed that 500 images are taken by one scanning and the scanning is performed at a rate of 60 times per second, it is necessary to take 30000 frames of the image per second. However, such an image capture device operating at high speed does not exist. Moreover, in the case where the image is scanned at such a slow rate that the device can follow, a motion picture cannot be taken.

SUMMARY OF THE INVENTION

The stereoscopic image capture device of this invention includes: an image capturing face on which light from an object is incident; an optical element disposed on a side of the image capturing face on which the light is incident, the optical element converting an angle at which the light is incident thereon to a distance from an optical axis the optical element; and an afocal optical system including a plurality of lenses, wherein the afocal optical system forms, on the optical element, an image of the object formed on one of the plurality of lenses which is closest to the object.

In one embodiment of the invention, the optical element includes a cylindrical lens array including a plurality of cylindrical lenses and a further cylindrical lens, the cylindrical lenses of the cylindrical lens array extending parallel in a first direction, the further cylindrical lens extending in a second direction perpendicular to the first direction and having a curvature in the second direction.

In another embodiment of the invention, the cylindrical lenses of the cylindrical lens array extend in a horizontal direction and the further cylindrical lens extends in a vertical direction.

In still another embodiment of the invention, the optical element includes an array of microlenses arranged in two-dimensions.

According to another aspect of the invention, a stereoscopic image capture device includes: an image capturing face on which light from an object is incident; an optical element disposed on a side of the image capturing face on which the light from the object Is incident, the optical element converting an angle at which the light from the object is incident thereon to a distance from an optical axis thereof; a reducing lens system provided between the image capturing face and the optical element, wherein the reducing lens system forms, on the image capturing face, an image of the object formed on a focal plane of the optical element.

In one embodiment of the invention, the optical element includes a cylindrical lens array including a plurality of cylindrical lenses and a further cylindrical lens, the cylindrical lenses of the cylindrical lens array extending parallel in a first direction, the further cylindrical lens extending in a second direction perpendicular to the first direction and having a curvature in the second direction.

In another embodiment of the invention, the cylindrical lenses of the cylindrical lens array extend in a horizontal direction and the further cylindrical lens extends in a vertical direction.

In still another embodiment of the invention, the optical element includes an array of microlenses arranged in two-dimensions.

The function of the present invention will be described below.

According to the stereoscopic image capture device of the present invention, an incident angle of a light beam from an object is converted into a distance from an optical axis by an optical element. As a result, not only the intensity of the incident light beam but also the direction thereof is recorded onto the image capturing face. Accordingly, since it is not necessary to take an image in a time divided manner, even motion pictures can be taken. By disposing an afocal optical system including a plurality of lenses on the side closer to an object with respect to the optical element, the image on the lens which is the closest to the object is imaged on the optical element. Therefore, the image capturing face can be made smaller than the display face.

According to another stereoscopic image capture device of the present invention, it is not necessary to take the image in a time divided manner as described above owing to the optical element as described above. By disposing a reducing lens system between the image capturing face and the optical element, the configuration of the image capture device can be simplified. Furthermore, since the image on the focal plane of the optical element is imaged on the image capturing face through the reducing lens system, the image capturing face can be made smaller than the display face.

Furthermore, in any one of the aforementioned stereoscopic image capture device, the optical element includes the cylindrical lens array including a plurality of cylindrical lens arranged in a parallel manner and the cylindrical lens having a curvature in a vertical direction, disposed so as to be close to the light incident side of the cylindrical lens array, a visually clear image containing parallax only in the horizontal direction can be obtained.

By using the two-dimensional lens array including a plurality of two-dimensionally arranged microlenses as the optical element, the parallax both in horizontal and vertical directions can be recorded.

Thus, the invention described herein makes possible the advantage of providing a stereoscopic image capture device having a smaller image capturing face than a display face, which is applicable as an input means of a three-dimensional display device utilizing a light reproduction method and capable of taking moving pictures.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described in detail by way of illustrative examples.

EXAMPLE 1

Figure 1:
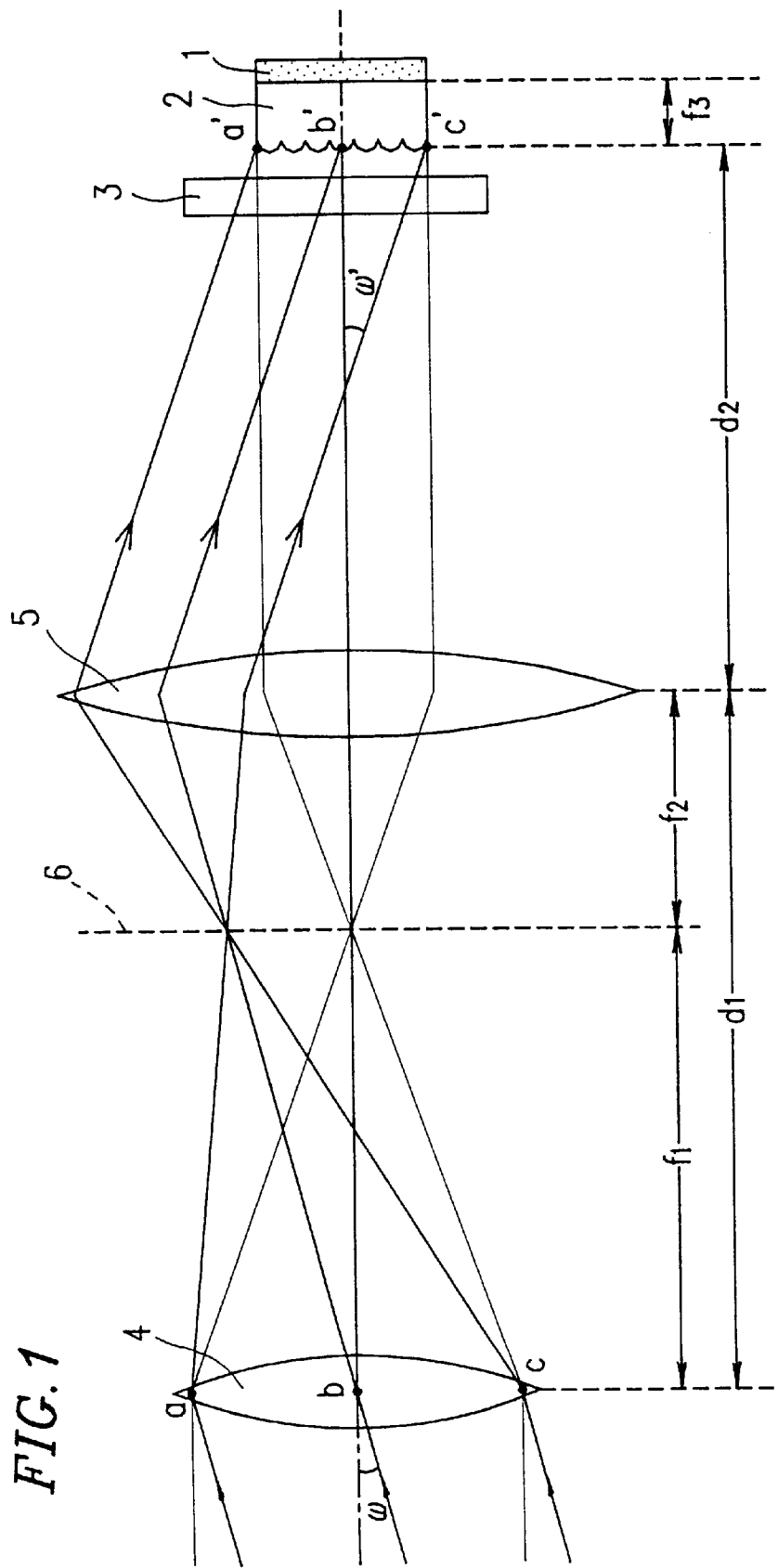
FIG. 1 is a horizontal cross-sectional view showing the configuration of a stereoscopic image capture device of Example 1 according to the present invention.

FIG. 1 is a horizontal cross-sectional view showing a stereoscopic image capture device of Example 1 according to the present invention. The stereoscopic image capture device includes: an image capturing face 1; a cylindrical lens array 2 disposed in front of the image capturing face 1; a cylindrical lens 3 for converging vertical components, disposed in front of the cylindrical lens array 2; and an afocal system including lenses 4 and 5 disposed in front of the cylindrical lens 3. Since the cylindrical lens 3 has a curvature only in the vertical direction, it does not affect the horizontal components. The image capturing face 1 is disposed on a focal plane of the cylindrical lens array 2. With such a configuration, the horizontal component is recorded by the cylindrical lens array 2 at the position on the image capturing face 1 determined by the incident angle thereof. As shown in FIG. 1, the cylindrical lens array 2 has a focal length $f_3$.

The lenses 4 and 5 constituting the afocal system disposed in front of the cylindrical lens 3 are provided so that an image side focal plane 6 of the lens 4 and an object side focal plane of the lens 5 are identical with each other. In the afocal system, a group of incident parallel light beams are held to be parallel even when going out from the afocal system. An incident angle $\omega$ and an exit angle $\omega'$ are generally different from each other.

In this image capture device, one of the cylindrical lenses of the cylindrical lens array 2 corresponds to one image capturing point. A width of the region, in which the image can be captured, extends from a point a' to a point c' on the cylindrical lens array 2. Since the afocal system is disposed in front of the cylindrical lens array 2, the width from the point a' to the point c' is extended to be from a point a to a point c. Points b and b' are present on an optical axis.

Figure 2:
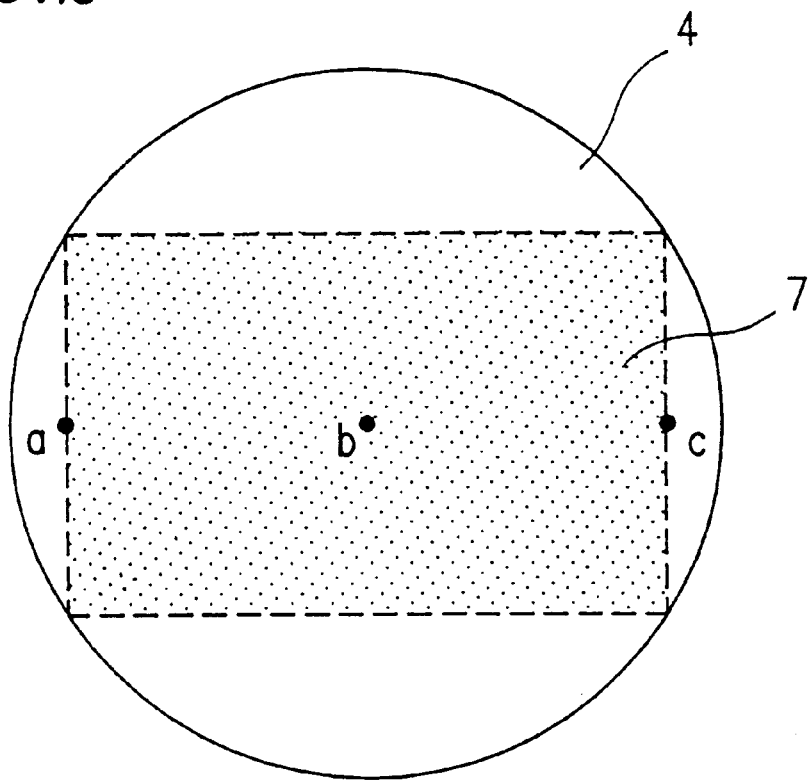
FIG. 2 is a schematic view for illustrating the dimensional relationship between a lens and a display face of Example 1 according to the present invention.

FIG. 2 illustrates the dimensional relationship between the lens 4 and a display face 7 of a three-dimensional display device which displays the image captured by the image capturing device shown in FIG. 1. As can be seen from FIG. 2, the lens 4 should be larger than the display face 7. A length from the point a to the point c on the lens 4 is required to be equal to a width of the display face 7 in a horizontal direction.

Figure 3:
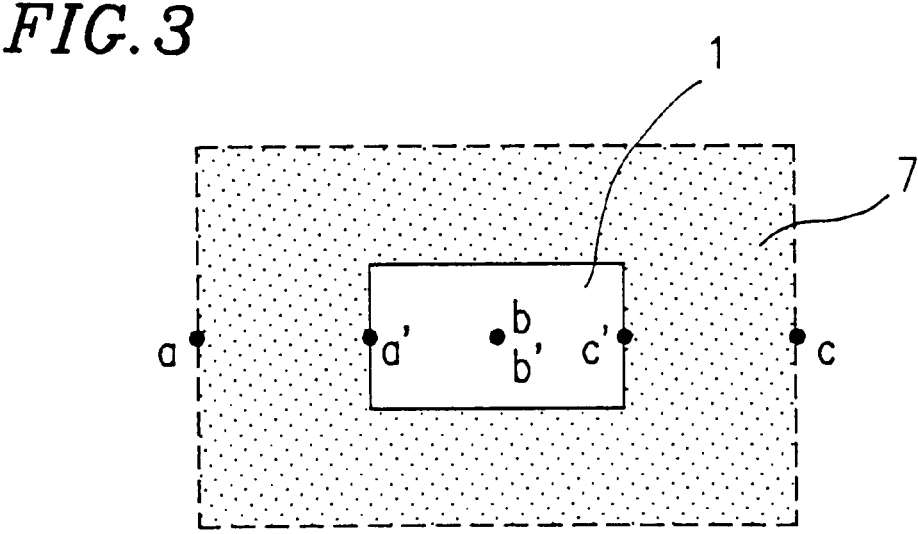
FIG. 3 is a schematic view for illustrating the dimensional relationship between a display face and the size of an image capturing face of Example 1 according to the present invention.

FIG. 3 illustrates the dimensional relationship between the image capturing face of the image capturing device 1 and the display face 7 of the three-dimensional display device. A length from the point a' to the point c' on the cylindrical lens array 2 is equal to a width of the image capturing face 1 in a horizontal direction. As described above, however, the afocal system extends the region having the width from the point a' to the point c' to the region having the width from the point a to the point c. Therefore, the image capturing face 1 can be made smaller than the display face 7. Regarding a longitudinal length of the region, the light beams are focused by the cylindrical lens 3 for converging verticals components as shown in FIG. 1, resulting in the reduction in size of the image capturing face.

In order that the points a, b and c on the lens 4 correspond to the respective points a', b' and c' on the cylindrical lens array 2, an image on the lens 4 should be focused on the cylindrical lens array 2. Therefore, in FIG. 1, the image capture device is constituted so as to satisfy the following Expression 1.

[Expression 1]

$$1/d_1 + 1/d_2 = 1/f_2$$

where $d_1$ is a distance between the lens 4 and the lens 5, $d_2$ is a distance between the lens 5 and the cylindrical lens array 2, and $f_2$ is a focal length of the lens 5.

With such a configuration, an apparent image capturing point can be placed on the lens 4.

As mentioned above, the intensity and direction of the recorded light beam are reproduced by the light reproduction method. With a common camera, however, an image projected onto a two-dimensional plane is obtained. Thus, the intensity of a light beam is recorded, but not the direction of the light beam. On the other hand, the image capture device according to the present invention records both intensity and direction of the light beam in such a way that the intensity and direction can be properly reproduced. The recording and reproduction according to the present invention will be described below in detail.

Figure 4:
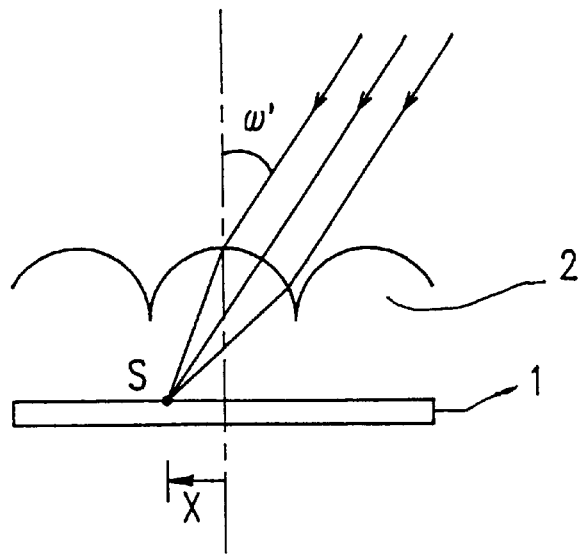
FIG. 4 is a horizontal cross-sectional view showing how a light beam incident on a cylindrical lens array travels, in Example 1 of the present invention.

FIG. 4 is a horizontal cross-sectional view showing how light beams travel in the case where a cylindrical lens array 2 is placed in front of an image capturing face 1. The image capturing face 1 is disposed at a distance equal to a focal length of the cylindrical array lens 2. With such a configuration, a group of parallel light beams incident on one cylindrical lens of the cylindrical lens array 2 are recorded onto a point S on the image capturing face 1. When an incident angle varies, the recording point varies in accordance therewith. Thus, the incident angle $\omega'$ and a distance x from the optical axis (represented by a broken line) of the recording point S have the relationship expressed by the following Expression 2.

[Expression 2]

$$x = f_3 \times \tan \omega'$$

where $f_3$ is a focal length of the cylindrical lens array 2.

From the above Expression 2, it is understood that the angle of the incident light beam is converted into the distance from the optical axis by the aforementioned configuration so as to be recorded.

Since the cylindrical lens array 2 in the image capturing device of this example can be replaced by a slit array, the case where the slit array is used will be described below for simplicity of the description.

Figure 5A:
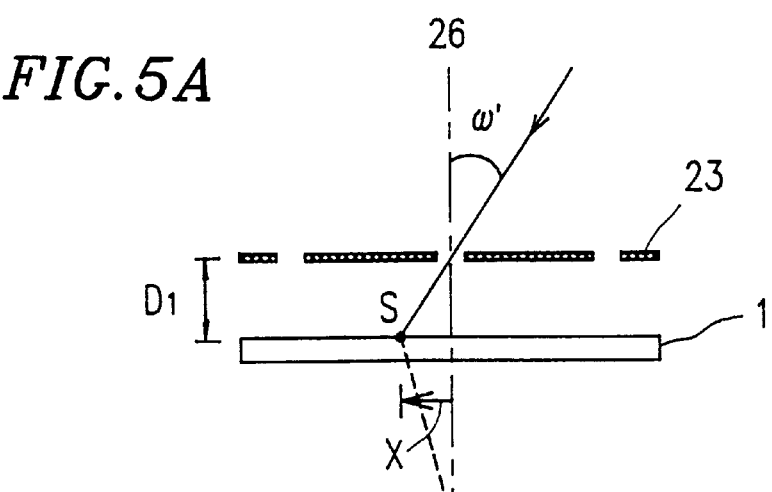
FIGS. 5A and 5B are horizontal cross-sectional views for illustrating the relationship between a recording point and a display point.

FIG. 5A shows the three-dimensional image capture device in which the cylindrical lens array 2 shown in FIG. 4 is replaced by a slit array 23. A distance between the image capturing face 1 and the slit array 23 is set so as to correspond to the focal length of the cylindrical lens array 2.

In FIG. 5A, the light beam passing through the slit array 23 at an angle ω' is recorded on a recording point S at distance x from the optical axis 26. Then, the relationship expressed by the following Expression 3 is satisfied.
[Expression 3]

$$x = D_1 \times \tan \omega'$$

where $D_1$ is a distance between the image capturing face 1 and the slit array 23.

Figure 5B:
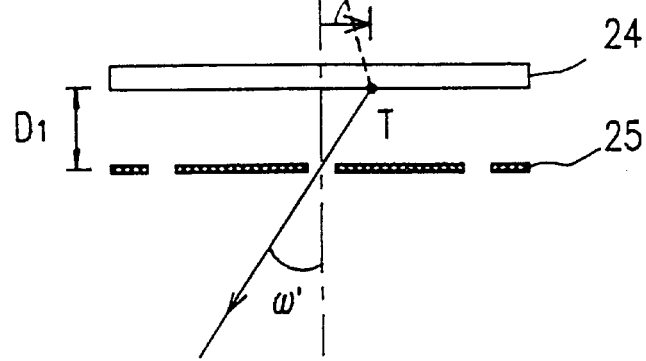

When reproducing the recording point S, the recording point S is converted into a symmetrical position T relative to the optical axis 26, thereby performing a display as shown in FIG. 5B. In FIG. 5B, a slit array 25 is disposed in front of the display face 24. A distance between the display face 24 and the slit array 25 is set so as to be equal to the distance $D_1$ during the recording. With such a configuration, the angle of the light beam going out from the display point T relative to the optical axis is identical with the incident angle ω'. Therefore, the light beam can be reproduced while maintaining the direction of the light beam during recording.

In FIG. 1, the incident angle ω with respect to the lens 4 serving as an apparent image capturing point differs from the incident angle ω' with respect to the cylindrical lens array 2. Moreover, the direction of the light beam incident on the lens 4 is opposite to that of the light beam incident on the cylindrical lens array 2 with respect to the optical axis 6. A method for properly reproducing such a light beam will be described below.

Figure 6:
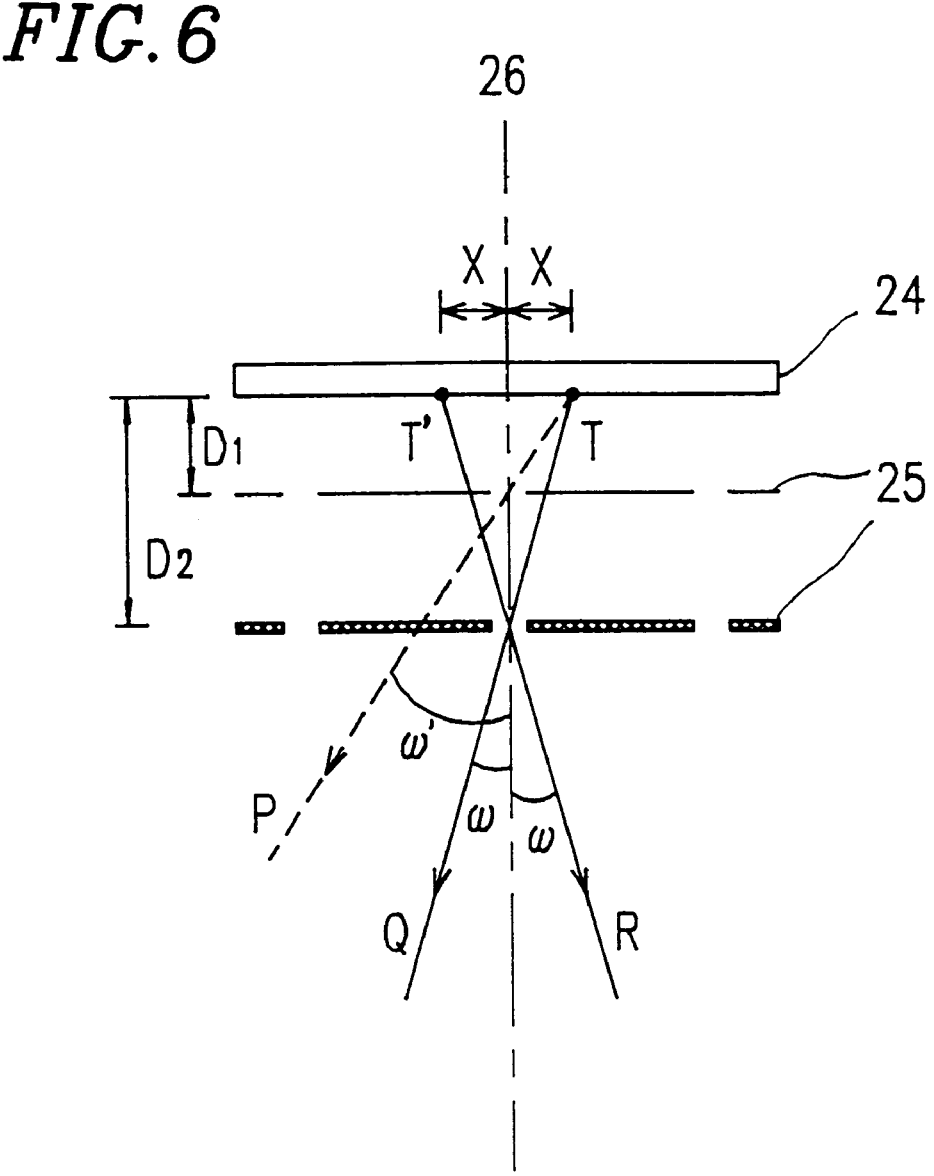
FIG. 6 is a horizontal cross-sectional view for illustrating a reproduction method in Example 1 according to the present invention.

FIG. 6 shows a display device which displays the image captured by the image capture device shown in FIG. 1. This display device includes a slit array 25 disposed in front of a display face 24. A display point T in FIG. 6 is obtained by symmetrically converting the recording point S in FIG. 5A of the light beam having an angle of incidence ω', which is recorded in such a manner as shown in FIG. 5A, with respect to the optical axis 26. Therefore, when the slit array 25 is disposed in front of the display face 24 at the distance of $D_1$, a light beam goes out from the slit array 25 at the exit angle ω' as in the case of FIG. 5B (a light beam P is shown as a dotted line in FIG. 6). However, since an actual angle of incidence in the image capture device is ω, an exit angle should also be ω.

In FIG. 1, the angles ω and ω' satisfy the relationship represented by the following Expression 4.
[Expression 4]

$$f_1 \times \tan \omega = f_2 \times \tan \omega'$$

$f_1$: focal distance of the lens 4

By deleting tan ω' from the Expressions 3 and 4, the following Expression 5 is obtained.
[Expression 5]

$$x = (f_1/f_2) \times D_1 \times \tan \omega$$

Accordingly, when the slit array 25 is disposed at such a position that $D_2$ satisfies the following Expression 6, the following Expression 7 is obtained.
[Expression 6]

$$D_2 = (f_1/f_2) \times D_1$$

[Expression 7]

$$x = D_2 \times \tan \omega$$

Thus, the angle of the light beam passing through the slit array 25 with respect to the optical axis 26 is ω (see a light beam Q in a solid line).

Furthermore, the incident direction (the angle of incidence ω) and the exit direction (the exit angle ω') are opposite to each other with respect to the optical axis 26 in FIG. 1. In order to correct the direction of the light beam, the display point T is converted to a point T' located symmetrical opposite display point T with respect to the optical axis 26 in FIG. 6. The light beam going out from the display point T' forms the angle ω with the slit array 25, and travels in the direction identical with the incident direction (see a light beam R in a solid line).

As described above, since the display point T and the recording point S are symmetrically positioned with respect to the optical axis 26, the positions of the display point T' and the recording point S are identical with each other. More specifically, in the image capture device of Example 1, it is not necessary to invert the pixel order for each slit so as to prevent the fore part and the back part of the reproduced image from being inverted. Thus, when the image recorded by the image capture device having the configuration as shown in FIG. 1 is to be reproduced, the recording point is regarded as the display point, and a distance between the display face 24 and the slit array 25 is set to be $(f_1/f_2)$ times the focal length for recording. Not only when the image is to be recorded but also when the image is to be displayed, a cylindrical lens array can be used instead of the slit array 25. In such a case, a focal length of the cylindrical lens array for display is set to be $(f_1/f_2)$ times the focal length for recording.

Example 1 specifically describes the case where a light beam incident on one of the cylindrical lenses of the cylindrical lens array 2 in the image capture device shown in FIG. 1. Since such a phenomenon is similarly caused for every cylindrical lens, a stereoscopic image input to the three-dimensional display device of the light reproduction method can be taken by the image capture device shown in FIG. 1. Since the image capture device shown in FIG. 1 records the directions of light beams exclusively for the horizontal components, the resultant stereoscopic image contains parallax only in the horizontal direction. However, since the resolution is not deteriorated in the vertical direction, a visually clear image can be obtained.

EXAMPLE 2

Figure 7:
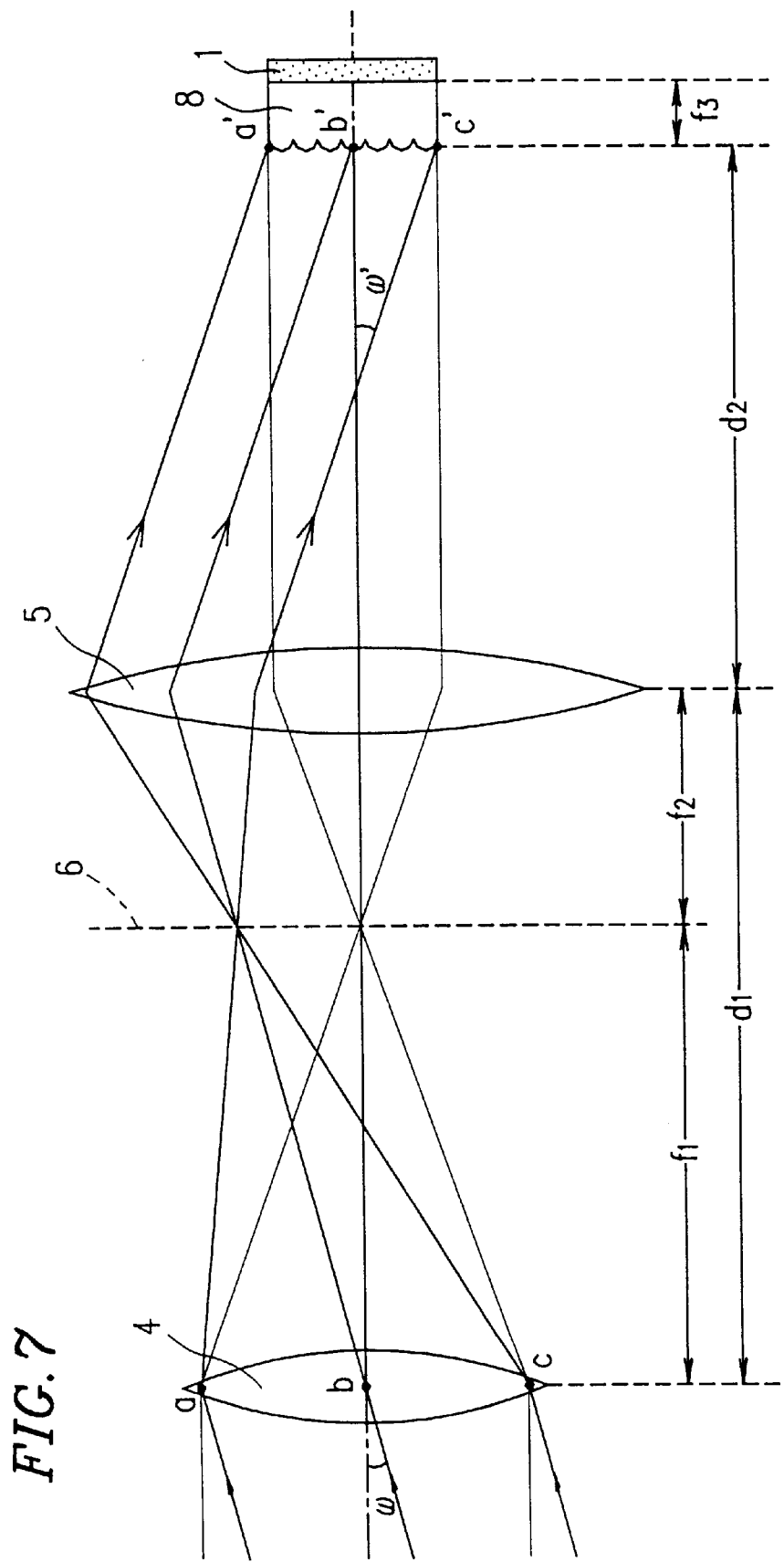
FIG. 7 is a horizontal cross-sectional view showing the configuration of a stereoscopic image capture device of Example 2 according to the present invention.

FIG. 7 is a horizontal cross-sectional view showing a stereoscopic image capture device of Example 2 according to the present invention. In Example 2, similar parts to those in Example 1 are similarly numbered.

The image capture device of Example 2 includes: the image capturing face 1; a two-dimensional lens array 8 disposed in front of the image capturing face 1; and the afocal system including the lenses 4 and 5, disposed in front of the two-dimensional lens array 8. As the two-dimensional lens array 8, a plurality of two-dimensionally arranged microlenses, that is, a so-called fly's eye lens is used. As shown in FIG. 7, the two-dimensional lens array 8 has a focal length $f_3$.

This image capture device shown in FIG. 7 differs from that shown in FIG. 1 in that the cylindrical lens 3 for converging vertical components is removed and the cylindrical lens array 2 is replaced by the two-dimensional lens array 8. As a result, the directions of light beams can be recorded not only for the horizontal components but also for the vertical components in Example 2. More specifically, the phenomenon occurring with respect to the horizontal components is described in Example 1. In Example 2, the similar phenomenon occurs with respect to the vertical components. Thus, the resultant stereoscopic image has parallax both in horizontal and vertical directions in the image capture device according to Example 2. When the stereoscopic image obtained by this image capture device is to be reproduced, it is necessary to dispose a two-dimensional lens array (alternatively, a pinhole array) having a focal length $(f_1/f_2)$ times the focal length for recording in front of the display face.

EXAMPLE 3

Figure 8:
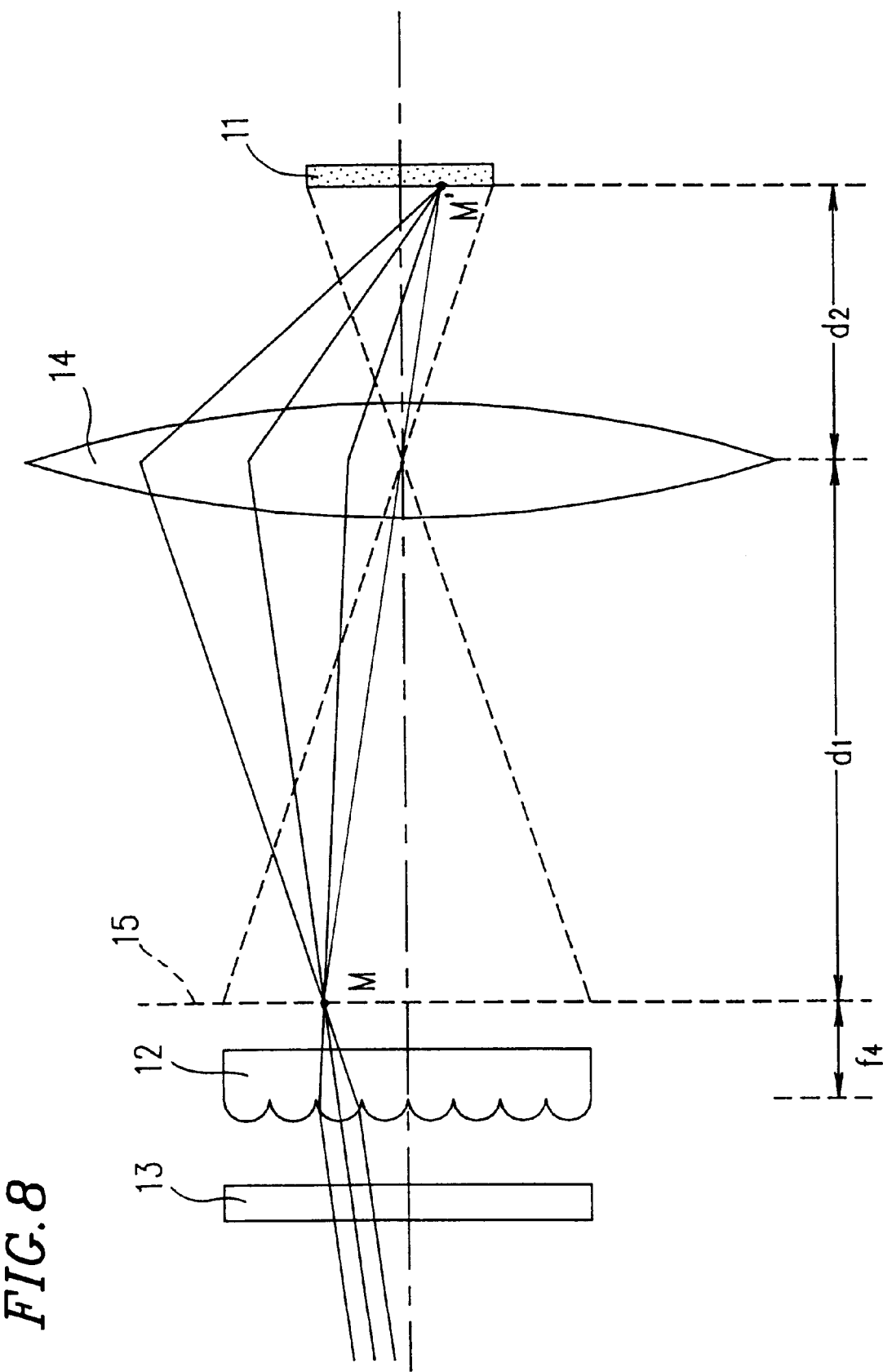
FIG. 8 is a horizontal cross-sectional view showing the configuration of a stereoscopic image capture device of Example 3 according to the present invention.

FIG. 8 is a horizontal cross-sectional view showing a stereoscopic image capture device of Example 3 according to the present invention.

The image capture device of Example 3 includes: an image capturing face 11; a cylindrical lens array 12 disposed in front of the image capturing face 11; a lens 14 provided between the image capturing face 11 and the cylindrical lens array 12; and a cylindrical lens 13 for converging vertical components, disposed in front of the cylindrical lens array 12. As shown in FIG. 8, the cylindrical lens array 12 has a focal length $f_4$. Since the cylindrical lens 13 has a curvature only in the vertical direction, it does not affect the horizontal components. The lens 14 provided between the cylindrical lens array 12 and the image capturing face 11 is disposed so as to converge an image on a focal plane 15 of the cylindrical lens array 12 onto the image capturing face 11. If the lens 14 is assumed to have a focal length $f_5$, the lens 14 is disposed at the position satisfying the relationship expressed by the following Expression 8.
[Expression 8]

$$1/d_1 + 1/d_2 = 1/f_5$$

where $d_1$ is a distance between the lens 14 and the focal plane 15, and $d_2$ is a distance between the lens 14 and the image capturing face 11.

Next, the operation principle of the image capture device of Example 3 will be described.

Figure 12:
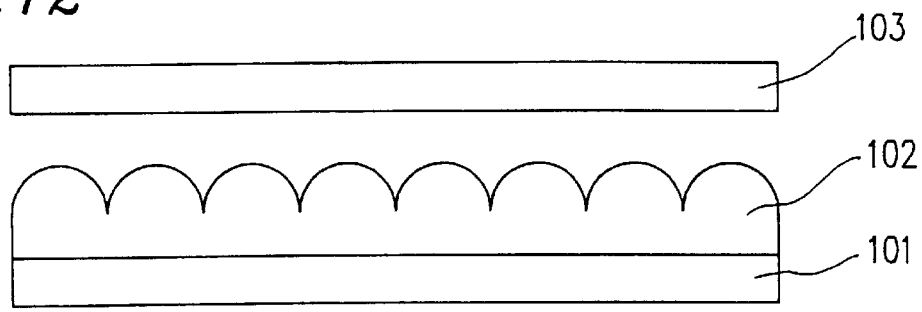
FIG. 12 is a schematic view showing an example of a conventional stereoscopic image capture device.
Figure 13A:
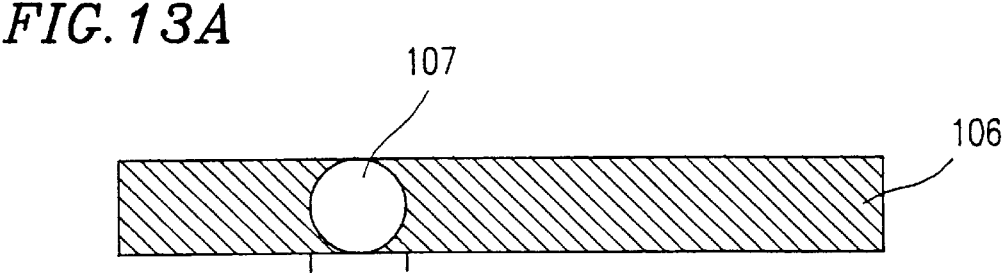
FIG. 13A is a horizontal cross-sectional view showing an example of another conventional stereoscopic image capture device.
Figure 13B:
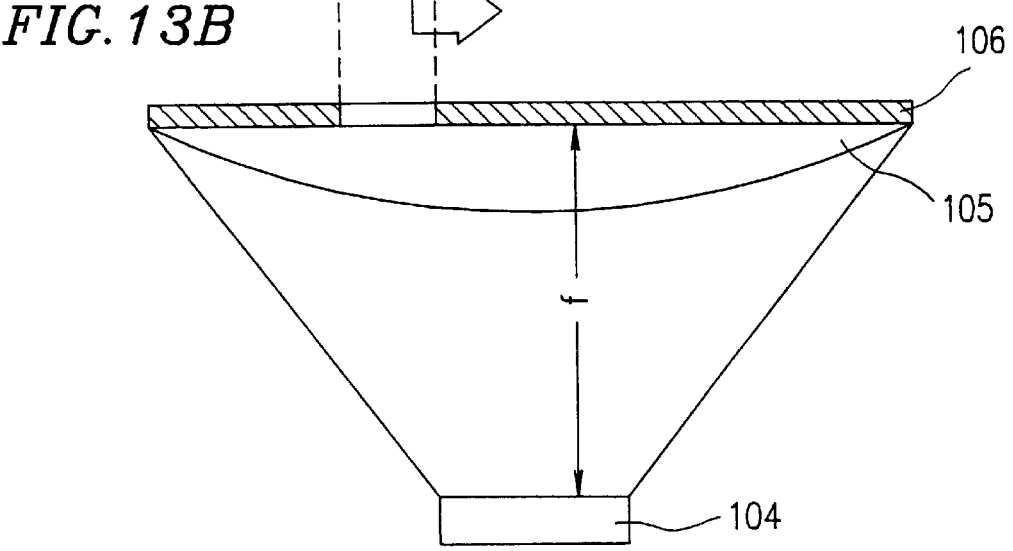
FIG. 13B is a vertical cros-ssectional view specifically showing a pinhole plate and a pinhole shown in FIG. 13A.

A group of parallel light beams incident on one of the cylindrical lenses of the cylindrical lens array 12 are converged on one point on the focal plane 15. Although the image capturing face having the same dimension as that of the display face is placed on the focal plane in the aforementioned conventional example shown in FIG. 12, the image is converged on the image capturing face 11 at a distance $(d_1+d_2)$ from the focal plane 15 through the lens 14 in Example 3. In the case where Expression 8 is satisfied, a point M on the focal plane 15 corresponds to a point M' on the image capturing face 11. By setting the distance so as to satisfy: $d_1 > d_2$, the image on the image capturing face 11 is a reduction of the image on the focal plane 15. As a result, the image capturing face 11 can be made smaller than the display face.

Since the image capture device shown in FIG. 8 records the directions of light beams merely for the horizontal components, the stereoscopic image obtained on the focal plane 15 contains parallax only in the horizontal direction. Since the stereoscopic image obtained on the image capturing face 11 is a reduction of the image on the focal plane 15, the resultant stereoscopic image similarly contains parallax only in the horizontal direction.

As described with reference to FIGS. 5A and 5B, in order to avoid the phenomenon in which the fore part and the back part of the reproduced image are inverted, it is necessary to invert the pixel order respectively for each slit (i.e., the left-most pixel of a slit becomes that slit's right-most pixel) in Example 3. Furthermore, since the image obtained on the image capturing face 11 through the lens 14 has the inverted upper and lower parts and the inverted right and left parts, the upper and lower parts and the right and left parts should be respectively inverted for reproduction. When the image is to be displayed, the thus obtained stereoscopic image is extended to have the same dimension as that of the display face. Thus, the extended display image is the same as that obtained in the conventional example shown in FIG. 12. Accordingly, the focal length of the cylindrical lens array disposed in front of the display face in the display device for displaying the image captured by the image capturing device of Example 3 should be equal to the focal distance of the cylindrical lens array used for recording, that is, $f_4$.

EXAMPLE 4

Figure 9:
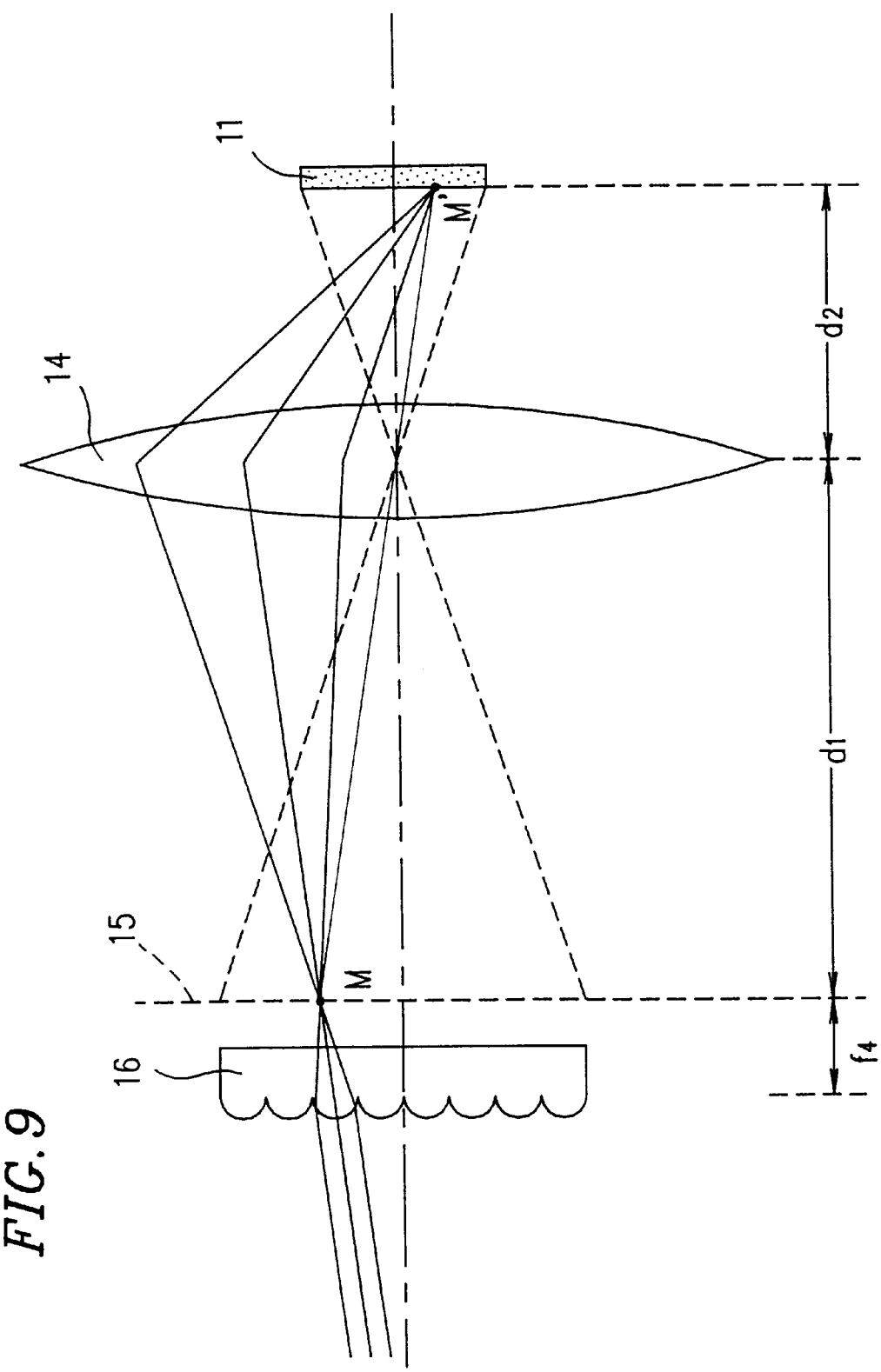
FIG. 9 is a horizontal cross-sectional view showing the configuration of a stereoscopic image capture device of Example 4 according to the present invention.
Figure 10:
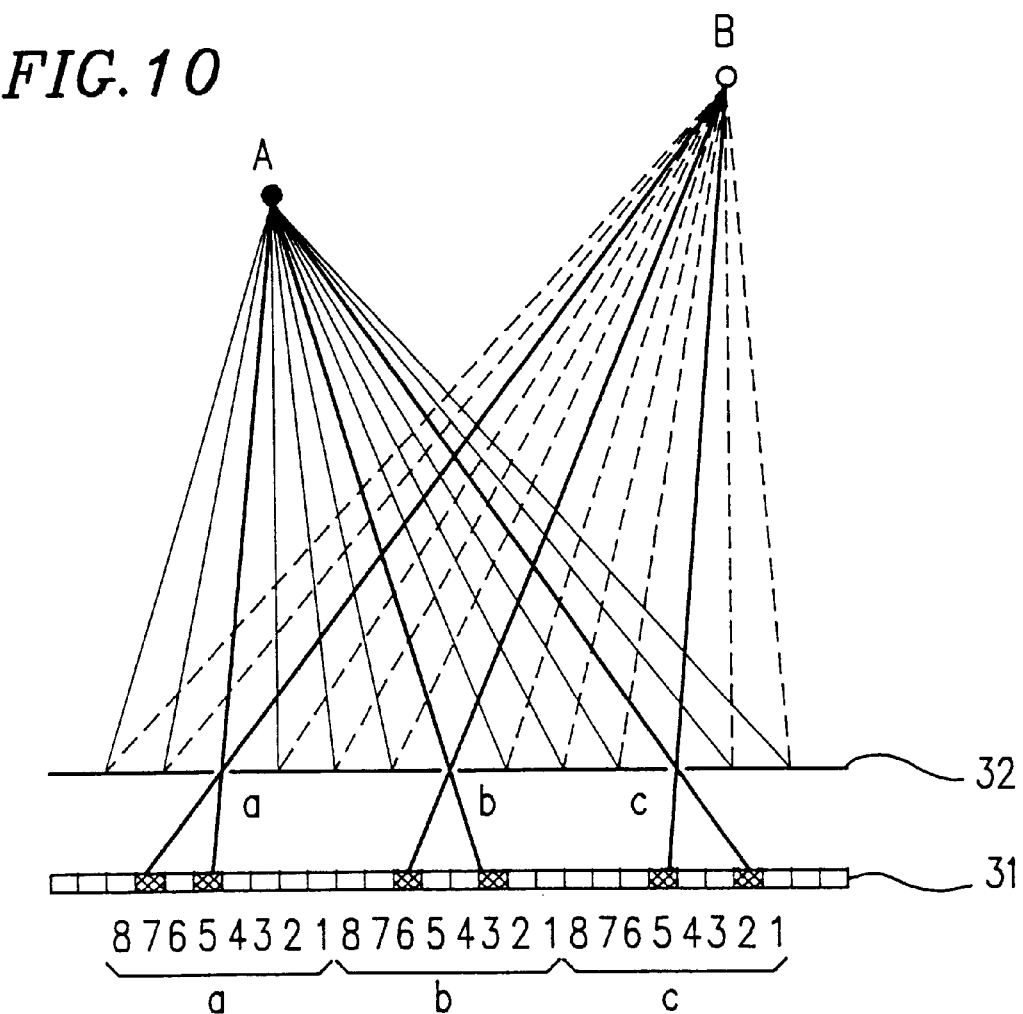
FIG. 10 is a schematic view showing the principle of recording by a light reproduction method.
Figure 11:
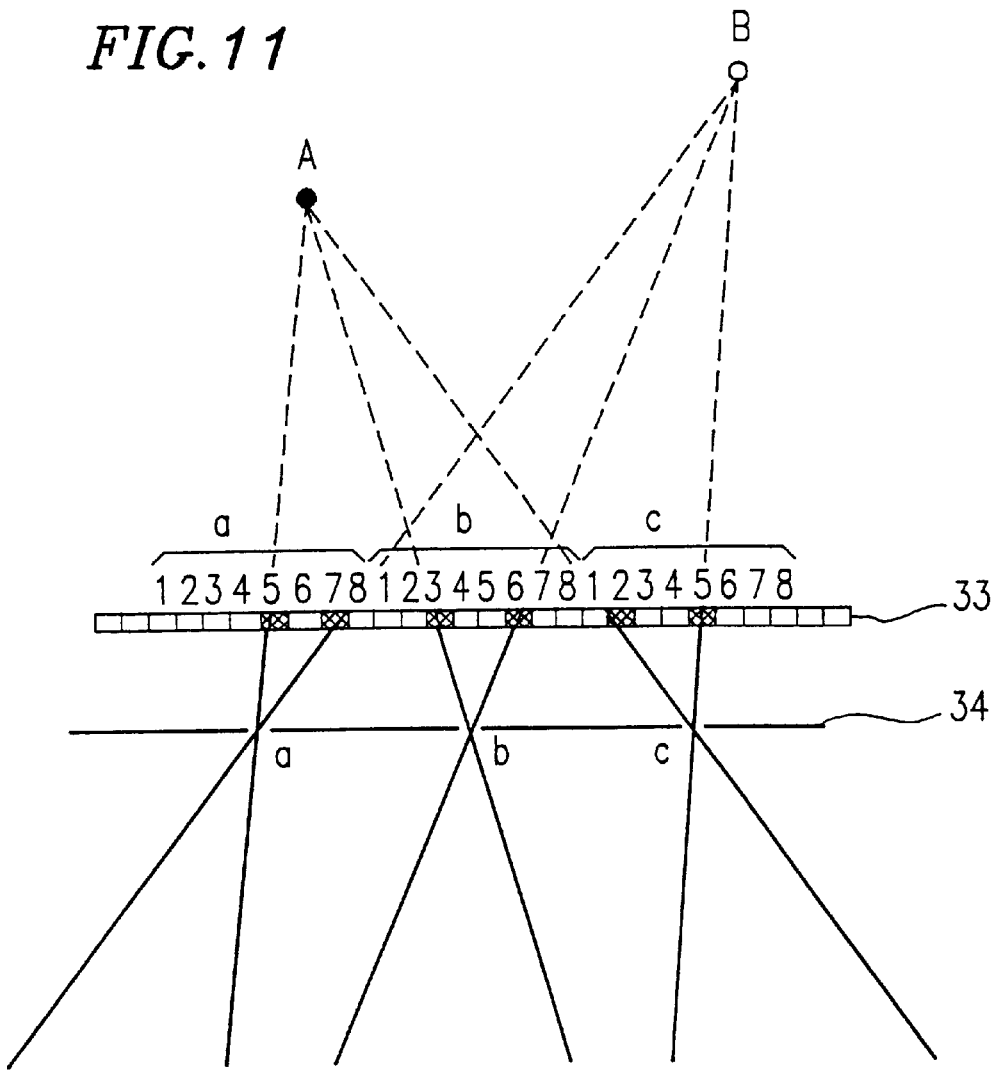
FIG. 11 is a schematic view showing the principle of reproduction by a light reproduction method.

FIG. 9 is a horizontal cross-sectional view showing a stereoscopic image capture device of Example 4 according to the present invention. In FIG. 9, parts similar to those in FIG. 8 are similarly numbered.

The image capture device of Example 4 includes: the image capturing face 11; a two-dimensional lens array 16 disposed in front of the image capturing face 11; and the lens 14 provided between the image capturing face 11 and the two-dimensional lens array 16. As the two-dimensional lens array 16, a plurality of two-dimensional arranged microlenses, that is, a so-called fly's eye lens is used. As shown in FIG. 9, the two-dimensional lens array 16 has the focal length $f_4$. The lens 14 is disposed so as to converge the image on the focal plane 15 of the two-dimensional lens array 16 on the image capturing face 11, that is, so as to satisfy Expression 8 described above.

The image capture device of Example 4 differs from that shown in FIG. 8 in that the cylindrical lens 13 for converging vertical components is removed and the cylindrical lens array 12 is replaced by the two-dimensional lens array 16. As a result, the image capture device can record the directions of light beams not only for the horizontal components but also for the vertical components. The resultant stereoscopic image contains parallax both in horizontal and vertical directions. Similarly to Example 3 described above, the image on the focal plane 15 is imaged on the image capturing face 11 in a reduced manner.

In order to avoid the phenomenon in which the fore part and the back part of the reproduced image are inverted, it is necessary to invert the pixel order respectively for each slit in Example 4. Furthermore, since the image obtained on the image capturing face 11 through the lens 14 has the inverted upper and lower parts and the inverted right and left parts, the upper and lower parts and the right and left parts should be respectively inverted for reproduction. When the image captured by the image capturing device of Example 4 is to be displayed, it is necessary to dispose a two-dimensional lens array (alternatively, a pinhole array) having the same focal length as that used for recording in front of the display face.

As is apparent from the above description, according to the stereoscopic image capture device of the present invention, the angle of incidence of a light beam from an object is converted into a length from an optical axis by an optical element. In this way, not only the intensity of the incident light beam but also the direction thereof are recorded onto the image capturing face. Accordingly, since it is not necessary to take an image in a time divisional manner, even motion pictures can be taken.

By disposing an afocal optical system including a plurality of lenses on the side closer to an object with respect to the optical element, the image on the lens which is the closest to the object is imaged on the optical element. Therefore, the image capturing face of the image capturing device can be made small as compared with the display face of a display device.

By disposing a reducing lens system between the image capturing face and the optical element, the configuration of the image capture device can be simplified. Furthermore, since the image on the focal plane of the optical element is imaged on the image capturing face through the reducing lens system, the image capturing face can be made smaller than the display face of the display device.

Furthermore, the optical element includes the cylindrical lens array including a plurality of cylindrical lens arranged in a parallel manner and the cylindrical lens having a curvature in a vertical direction, disposed so as to be close to the light incident side of the cylindrical lens array, a visually clear image containing parallax only in the horizontal direction can be obtained.

By using the two-dimensional lens array including a plurality of two-dimensional arranged microlenses as the optical element, the parallax both in horizontal and vertical directions can be recorded.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A stereoscopic image capture device comprising:

an image capturing face on which a plurality of light beams from an object is incident;

an optical element defining a plurality of element lenses which have the same focal distance, a focal plane of the optical element being disposed on the image capturing face, so as to record intensity and direction of each of the plurality of the light beams from a point of the object through the plurality of element lenses on the image capturing face; and an afocal optical system provided between the object and the optical element including a plurality of lenses, the afocal system directly receiving the plurality of light beams from the object, wherein the afocal optical system reduces a width of the plurality of light beams which pass through one of the plurality of lenses which is closest to the object, and provides a reduced width of the plurality of light beams incident on the optical element.

2. A stereoscopic image capture device according to claim 1, wherein the optical element comprises a cylindrical lens array including a plurality of cylindrical lenses and a further cylindrical lens, the cylindrical lenses of the cylindrical lens array extending parallel in a first direction, the further cylindrical lens extending in a second direction perpendicular to the first direction.

3. A stereoscopic image capture device according to claim 2, wherein the cylindrical lenses of the cylindrical lens array extend in a horizontal direction and the further cylindrical lens extends in a vertical direction.

4. A stereoscopic image capture device according to claim 1, wherein the optical element comprises an array of microlenses arranged in two-dimensions.

5. A stereoscopic image capture device according to claim 1, wherein the afocal optical system comprises:

a first lens having an image side focal plane, the first lens being closest to the object among the plurality of lenses and a second lens having an object side focal plane, wherein the image side focal plane of the first lens and an object side focal plane of the second lens are identical with each other, and wherein the afocal optical system is constituted so as to satisfy the following expressing $1/d_1 + 1/d_2 = 1/f_2$, wherein $d_1$ is a distance between the first lens and the second lens, $d_2$ is a distance between the second lens and the optical element, and $f_2$ is a focal length of the second lens.

6. A stereoscopic image capture device comprising:

an image capturing face on which a plurality of light beams from an object is incident;

an optical element defining a plurality of element lenses which have the same focal distance, a focal plane of the optical element being disposed in a spaced apart relationship from the image capturing face, so as to form a first image on the focal plane of the optical element;

reducing lens system provided between the image capturing face and the optical element, wherein the reducing lens system forms on the image capturing face a reduced size image of the first image formed on the focal plane, so as to record intensity and direction of each of the plurality of the light beams from a point of the object through the plurality of element lenses on the image capturing face.

7. A stereoscopic image capture device according to claim 6, wherein the optical element comprises a cylindrical lens array including a plurality of cylindrical lenses and a further cylindrical lens, the cylindrical lenses of the cylindrical lens array extending parallel in a first direction, the further cylindrical lens extending in a second direction perpendicular to the first direction.

8. A stereoscopic image capture device according to claim 7, wherein the cylindrical lenses of the cylindrical lens array extend in a horizontal direction and the further cylindrical lens extends in a vertical direction.

9. A stereoscopic image capture device according to claim 6, wherein the optical element comprises an array of microlenses arranged in two-dimensions.

* * * * *

UNITED STATES PATENT AND TRADEMARK OFFICE
CERTIFICATE OF CORRECTION

PATENT NO. : 6,072,627  
DATED : June 6, 2000  
INVENTOR(S) : Toshio Nomura, Masayuki Katagiri, Keisuke Iwasaki and Noritoshi Kako Page 1 of 1

It is certified that error appears in the above-identified patent and that said Letters Patent is hereby corrected as shown below:

Title page,  
Item [*] Notice, please delete the following sentence:

[*] NOTICE  
    This patent is subject to a terminal disclaimer.

Signed and Sealed this

Twenty-fifth Day of December, 2001

Attest:

*Attesting Officer*

JAMES E. ROGAN  
*Director of the United States Patent and Trademark Office*